United States Patent [19]
Zabrocki et al.

[11] 4,321,170

[45] Mar. 23, 1982

[54] AQUEOUS POLYESTER DISPERSIONS

[75] Inventors: Karl Zabrocki, Buettgen; Rolf Dhein, Krefeld-Bockum; Franz Weider, Leverkusen; Klaus Höhne, Leverkusen; Kurt Schorn, Leverkusen, all of Fed. Rep. of Germany

[73] Assignee: Bayer Aktiengesellschaft, Leverkusen, Fed. Rep. of Germany

[21] Appl. No.: 206,880

[22] Filed: Nov. 14, 1980

Related U.S. Application Data

[63] Continuation of Ser. No. 69,569, Aug. 24, 1979, abandoned.

[30] Foreign Application Priority Data

Aug. 29, 1978 [DE] Fed. Rep. of Germany ....... 2837552

[51] Int. Cl.³ .................... C08L 61/28; C08L 91/00; C09D 5/02
[52] U.S. Cl. .................................. 524/285; 524/539; 524/601; 106/252
[58] Field of Search .......... 260/29.2 E, 22 M, 22 CQ, 260/22 A, 29.4 R; 526/911

[56] References Cited

U.S. PATENT DOCUMENTS

| | | | |
|---|---|---|---|
| 3,434,987 | 3/1969 | Dhein et al. | 260/29.2 E |
| 3,477,976 | 11/1969 | Nakamuro et al. | 260/22 M |
| 4,069,183 | 1/1978 | Daimer | 260/29.3 |
| 4,122,051 | 10/1978 | Friberg et al. | 260/29.2 E |
| 4,171,293 | 10/1979 | Eschwey et al. | 260/29.2 E |
| 4,179,420 | 12/1979 | Laganis | 260/21 |

*Primary Examiner*—Theodore E. Pertilla
*Attorney, Agent, or Firm*—Connolly and Hutz

[57] ABSTRACT

Aqueous dispersions of polyesters or alkyd resins for coatings are prepared by co-condensation of 10 to 100 mol-%, calculated on the sum of polybasic carboxylic acids, of polybasic acids whose carboxyl groups are attached to secondary and/or tertiary carbon atoms. Said dispersions are excellently stable and yield coatings with outstanding properties.

4 Claims, No Drawings

AQUEOUS POLYESTER DISPERSIONS

This application is a continuation of application Ser. No. 069,569 filed Aug. 24, 1979, now abandoned.

This invention relates to aqueous dispersions based on alkyd resins or oil-free polyesters and to their use for the production of stoving lacquers.

In this connection, the term "aqueous dispersions" means heterogeneous systems which are opaque and in which the organic resin phase is distributed in water as particles having an average size of from 50 to 3000 nm. The term "aqueous dispersions" as used here therefore does not include those alkyd resin or polyester solutions which form transparent solutions in the aqueous phase owing to neutralised acid groups; these resins generally have acid numbers above 40 and are previously dissolved in water-miscible organic solvents and, after neutralisation with water, are diluted to form homogeneous, transparent solutions.

There are two main reasons for the increasing use of aqueous alkyd resin or polyester dispersions. Firstly, they have the advantage of requiring no organic solvents and secondly, in contrast to coating compositions applied from organic solution, they have virtually no tendency to drip down vertical surfaces (see F. Armitage, L. G. Trace, J. Oil and Colour Chemists Assoc. 1957, page 860).

Lacquers based on aqueous alkyd resin dispersions or oil-free polyester dispersions should be stable in storage and form water-resistant coatings which have a high gloss even when containing a large amount of pigment. An ideal combination of these properties has hitherto not been achieved; thus, coatings obtained from dispersions according to German Offenlegungsschrift No. 2,554,330 and German Offenlegungsschrift No. 2,640,127, for example, do not have sufficient gloss.

It has now surprisingly been found that coating compositions having the desired combination of advantageous properties can only be obtained if alkyd resins or oil-free polyesters with a particular acid number and selected acid component are used for preparing the aqueous dispersions. Starting from these dispersions, excellent stoving lacquers are obtained by mixing them with water-soluble aminoplasts.

The present invention provides aqueous dispersions obtained from (A) 25-60% by weight of at least one dispersed alkyd resin or oil-free polyester having an average molecular weight $\overline{Mn}$ from 800 to 6000, (B) 3-15% by weight of at least one emulsifier, and (C) 25-62% by weight of aqueous phase, based in each case on the sum of components (A), (B) and (C), characterised in that the alkyd resin or oil-free polyester (A) has an acid number of from 3-25, preferably from 4-20, and the acid component of the alkyd resin or oil-free polyester (A) has the following composition:

(a) 10 to 100 mol%, preferably 30-100 mol %, in particular 80-100 mol %, of condensed residues of polyvalent carboxylic acids having 5-30 C-atoms in which the carboxyl groups are attached to secondary and/or tertiary carbon atoms which are not part of an aromatic system and are not attached to other C-atoms by a multiple bond, (b) 0 to 90 mol %, preferably 0 to 70 mol %, in particular 0 to 20 mol %, of condensed residues of other aliphatic and/or aromatic polybasic carboxylic acids having 4-12 C-atoms, and (c) 0 to 60% by weight of condensed residues of aliphatic, cycloaliphatic and/or aromatic monocarboxylic acids having 6-35 C-atoms, the molar percentages being in each case based on the sum of components (a) and (b) and the percentages by weight of (c) being based on alkyd resin or polyester (A).

The invention also provides a process for the preparation of these dispersions, in which process the alkyd resin or oil-free polyester A is homogenised solvent-free with emulsifier B at temperatures of from 80°-120° C., and water or (if the water contains additives) the aqueous phase C is stirred into this solvent-free reaction mixture, or conversely the solvent-free mixture is stirred into the water or aqueous phase C.

The invention also relates to the use of the dispersions according to the invention as stoving lacquers in combination with water-soluble aminoplasts.

The dispersions according to the invention combine excellent stability with outstanding lacquer technical properties.

The term "polyesters" is used hereinafter to denote fatty acid and oil-free polyesters and the term "alkyd resins" is used to denote fatty acid and oil modified polyesters.

The terms "alkyd resins" and "polyesters" mean polycondensates prepared by known methods of polycondensation of alcohols and carboxylic acids, such as the type of polycondensates defined, for example, in Römpps's Chemielexikon, Vol. 1, page 202, publishers Frankh'sche Verlagsbuchhandlung, Stuttgart, 1966, or described by D. H. Solomon, in "The Chemistry of Organic Filmformers", pages 75-101, John Wiley & Sons, Inc., New York, 1967.

The term "polybasic carboxylic acids" is used hereinafter to denote di-, tri- and tetracarboxylic acids.

The preferred polybasic carboxylic acid (a) used for the preparation of the alkyd resins or polyesters A are those in which the carboxyl groups are directly attached to cycloaliphatic or cycloolefinic rings; among these, dicarboxylic acids are particularly preferred. The following are preferred cyclic polybasic carboxylic acids: cyclobutane dicarboxylic acids, cyclopentane dicarboxylic acids, cyclopentene dicarboxylic acid, cyclohexene dicarboxylic acid, cyclopentane tricarboxylic acids, cyclohexane dicarboxylic acids, cyclohexane tricarboxylic acids, cycloheptane dicarboxylic acids, cycloheptane tricarboxylic acids, norbornane dicarboxylic acids, norbornene dicarboxylic acid and endoethylenecyclohexane dicarboxylic acids.

The ring structures may, of course, consist of condensed rings joined together by single bonds, by divalent groups or in spiroform, or polycyclic compounds. Preferred polybasic carboxylic acids of this type include compounds corresponding to the following formulae:

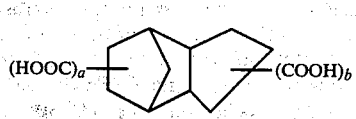

I wherein a and b are integers and the sum of a and b should be a number from 2 to 4;

compounds corresponding to the following formula:

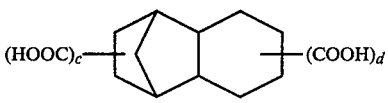
II wherein c and d are integers and the sum of c and d should be a number from 2 to 4;

Compounds corresponding to the following formula:

III wherein e and f are integers and the sum of e and f should be a number from 2 to 4;

Compounds corresponding to the following formula:

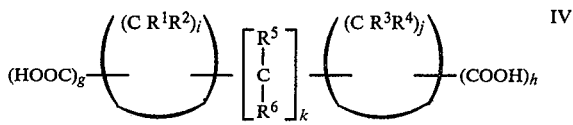
IV wherein g and h are integers and the sum of g and h should be a number from 2 to 4; i and j are integers from 4 to 8 and k is zero or an integer from 1 to 10, and $R^1$ to $R^6$ denote hydrogen atoms or alkyl groups with 1 to 4 C-atoms:

Compounds corresponding to the following formula:

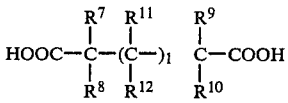
V wherein l represents an integer from 1 to 4, $R^7$ and $R^9$ stand for an alkyl group having 1 to 4 C-atoms, and $R^8$, $R^{10}$, $R^{11}$ and $R^{12}$ each denote a hydrogen atom or an alkyl group having 1 to 4 C-atoms.

Esterifiable derivatives of the acids, such as their anhydrides or esters may, of course, be used instead of the acids themselves. The following have proved to be particularly suitable: 1,2,3,6-tetrahydrophthalic acid, methyltetrahydrophthalic acid, and hexahydrophthalic acid; among these, tetrahydrophthalic acid is particularly preferred.

Exceptionally stable dispersions are obtained when the polybasic carboxylic acids (a) are used as the only acid components.

The preferred other polybasic carboxylic acid (b) for the preparation of alkyd resins or polyesters A are those which have 4-12 C-atoms, such as phthalic acid, isophthalic acid, terephthalic acid, trimellitic acid, adipic acid, succinic acid, glutaric acid, fumaric acid, axelaic acid and maleic acid and their esterifiable derivatives. The mixture of polycarboxylic acids should not contain more than 20 mol % of fumaric acid and maleic acid. Combinations of from 10 to 30 mol % of phthalic acid with from 70 to 90 mol % of tetrahydrophthalic acid should be particularly mentioned because the lacquers produced from them are not only very stable in storage but also have excellent levelling properties.

The polyesters A may be built up from polybasic carboxylic acids and polyhydric alcohols alone but they may also be modified by the incorporation by condensation of monocarboxylic acid (c), optionally with 6–35 C-atoms. Preferred monocarboxylic acids (c) include benzoic acid, hexahydrobenzoic acid, butyl benzoic acid, toluic acid, α-ethylhexanoic acid, fatty acids and their mixtures obtained from natural oils such as soya fatty acid, safflower oil fatty acid, cottonseed oil fatty acid, linseed oil fatty acid, ground nut oil fatty acid and ricinene fatty acid. These oils may also be used as such and incorporated in the polyesters by transesterification and, if indicated, dehydration reactions. When oil-modified polyesters, also known as alkyd resins, are used in the present invention, they result in coatings with exceptionally high filling power.

The preferred polyhydric alcohols used for the preparation of the alkyd resins and polyesters A are those which have from 2 to 6, preferably 2 to 4 OH-groups and from 2 to 24 C-atoms in the molecule, such as ethylene glycol, propylene glycols, butanediols, neopentylglycol, hexanediols, trimethylpentanediol-(1,3), dimethylolcyclohexane, perhydrobisphenols, alkoxylated bisphenols having two alkylene oxide units per molecule, glycerol, trimethylolethane, trimethylolpropane, trimethylolhexane, pentaerythritol, dipentaerythritol, sorbitol and mixtures thereof. Neopentyl glycol, trimethylolpropane, dimethylcyclohexane and perhydrobisphenol have been found to be particularly suitable.

The alkyd resins and polyesters A may also contain monohydric alcohols such as methanol, propanol, cyclohexanol, 2-ethylhexanol or benzyl alcohol incorporated by condensation in quantities of up to 15% by weight, based on the alkyd resin or polyester A. Furthermore, up to 25% of the ester bonds may be replaced by urethane bonds.

The alkyd resins and polyesters A which fall within the scope of the present invention are for the most part water-insoluble, fusible masses which cannot be distributed in the aqueous phase without further additives. It is therefore not desirable to use polyalkylene oxides, the so-called poly waxes, as polyhydric alcohols for the synthesis of component A since components of this type render the resin hydrophilic, thereby reducing the water resistance of the hardened product.

The choice of the nature and quantity of the individual raw materials used for condensation to produce the alkyd resin or polyester A depends on the desired molecular weight and envisaged field of application of the lacquer to be produced from them. The relationships between molecular weight and quantity of raw material have been described in detail by U. Holfort in "Farbe und Lack" 68 (1962), pages 513–517 and 598–607.

A high aromatic content imparts exceptional hardness to the coatings whereas a high aliphatic content imparts good elasticity. For the production of stoving lacquers, one would generally use alkyd resins or polyesters A with hydroxyl numbers of from 80 to 130 preferably about 100. Oil contents of up to 45% by weight are generally sufficient for stoving lacquers.

Owing to the large number of possible compositions of resin types ranging from the oil-free to the oil-rich, the viscosity range to be aimed for can only be indicated approximately. The viscosity of the alkyd resins or polyester A generally corresponds to an outflow time according to DIN 53 211 of from 50 to 250 seconds measured on a 50% by weight solution in xylene, preferably from 90 to 130 seconds for short to medium oil resins and preferably from 80 to 130 seconds for oil-free resins.

Preparation of the alkyd resins and polyesters A may be carried out by known methods, see "Methoden der Organischen Chemie" (Houben-Weyl), Vol. 14/2, part 2, 4th Edition, publishers Georg Thieme Verlag, Stuttgart 1963, pages 1-5, 21-23 and 40-44; or C. R. Martens, Alkyd Resins, Reinhold Plastics Application Series, Reinhold Publishing Company 1961, pages 51-59. According to these methods, polyhydric and optionally also monohydric alcohols and polybasic carboxylic acids and optionally monocarboxylic acids, optionally oils and their esterifiable derivatives are reacted together by solvent-free or azeotropic esterification, preferably in an inert atmosphere, e.g. at temperatures of from 140° to 260° C. The progress of the reaction can be followed by measurements of the acid number and viscosity.

Polycondensates may be carried out in one or more stages. For example, concentration of an oil by boiling or reacidification to the polysemiester may be carried out in known manner as a separate stage from the polyester synthesis reaction. The average molecular weight of the alkyd resins or polyesters A is determined by vapour pressure osmometry in dioxane and acetone; where differing values are obtained, the lower is regarded as the correct value.

The dispersions according to the invention may be prepared by first preparing an alkyd resin or a polyester based on the above-mentioned polycarboxylic acids and then dispersing it in the aqueous phase by means of emulsifying substances.

The alkyd resins or polyesters A may be dispersed in the aqueous phase by dissolving them together with one or more emulsifiers and optionally other additives in solvents which are compatible or partly compatible with water, e.g. acetone, ethyl alcohol or isopropanol, stirring the resulting solution into the aqueous phase and then removing the organic solvent by evaporation.

It is preferred, however, to carry out a process in which A is intimately stirred with the additives in the solvent-free state at 80° to 120° C., and the resulting solvent-free mixture is then stirred into the aqueous phase.

This process may generally be carried out in the type of reactor normally used for the preparation of alkyd resins. High speed mixing assemblies or mechanical stirrers are in most cases unnecessary. Dispersion of the solvent-free melt may, of course, also be carried out by addition of the organic resin phase to the aqueous phase. In that case, the emulsifiers B may first be distributed in the aqueous phase C, and the emulsifier-free alkyd or polyester resin A may then be introduced into the mixture of B and C.

The emulsifier B used for dispersing the alkyd resins or polyesters A may be an ionic or non-ionic or mixed type of emulsifiers, such as those described e.g. in "Methoden der Organischen Chemie" (Houben-Weyl), Vol. 14/1, Part 1, 4th Edition, Georg Thieme Verlag, Stuttgart 1961, pages 190-208.

Preferred among the ionic emulsifiers are $C_{12-18}$ alkyl sulphates and sulphonates having a $C_{12}$ to $C_{18}$ alkyl residue. Preferred non-ionic emulsifiers include compounds corresponding to the formulae:

$$R^{13}-CH_2-O-R_m{}^{15}H; R^{14}-CO-O-R_n{}^{16}H$$

wherein $R^{13}$ and $R^{14}$ denote an aliphatic, cycloaliphatic, araliphatic or aromatic group having from 7 to 25 C-atoms; $R^{15}$ and $R^{16}$ denote $C_2H_5$, $C_3H_7$ or $C_4H_9$; and m and n are integers of from 3 to 100.

Preferred mixed type emulsifiers B may be obtained by sulphating the hydroxyl groups of non-ionic emulsifiers.

Oligomers and polymers may also be used as emulsifiers B or emulsion stabilizing substances B. These include, for example, protective colloids such as casein, partially and completely saponified polyvinyl acetate, polymers and copolymers of acrylic acid or methacrylic acid as well as polyesters in which the carboxyl groups may be partly or completely neutralised or also polyesters which are coupled either directly through ester bonds or through an intermediate member to one or more polyalkylene oxide chains having 2 to 4 C-atoms in the alkylene oxide residue, this intermediate member being derived from a melamine resin or from a polyisocyanate unit or silicone. The last mentioned modified polyesters will hereinafter be referred to as emulsifier resins and result in exceptionally compatible coatings. Such emulsifier resins may be synthesised from an optionally oil-modified polyester as the hydrophobic part and a polyalkylene oxide optionally blocked on one side by methoxy, ethoxy, propoxy or butyoxy groups, e.g. a polyethylene oxide or polypropylene oxide having 6 to 100, preferably 10 to 70 alkylene oxide units with 2 to 4 C-atoms in the alkylene group, as the hydrophilic part. The polyester portion may be prepared from the same raw materials as those described above for the resin A which is to be emulsified, but it may in addition be modified with polyalkylene oxide residues (e.g. poly wax). It is possible, as already indicated, to prepare the polyester part of the emulsifer resin separately and subsequently attach it to the polyalkylene oxide through a melamine resin or a polyisocyanate. Methods of this type have been described, e.g. in German Offenlegungsschriften Nos. 2,503,389; 2,455,896; 2,555,896; 2,503,388; 2,528,212 and 3,556,621. The polyalkylene oxides used may be homopolyethers but they may also be copolyethers in block distribution or statistical distribution.

The quantity of polyalkylene oxide groups in the emulsifier resin may be from 5 to 70% by weight, preferably from 5 to 30% by weight, based on the emulsifier resin. The emulsifier resin in addition preferably contains COOH groups, which may be partly or completely neutralised or not at all, and which are contained in the resin in a quantity such that the acid number in the unneutralised state is from 0 to 50, preferably from 15 to 35. The neutralising agents used are usually alkalies, ammonia or amines, particularly suitable neutralising agents being triethylamine, triethanolamine, diethanolamine, dimethylethanolamine, methyldiethanolamine and N,N-dimethylaminomethylpropanol.

Particularly suitable emulsifier resins are prepared from an OH-rich polyester based on phthalic acid and/or tetrahydrophthalic acid and trimethylolpropane by a reaction according to German Offenlegungsschrift No. 2,556,621 and 2,528,212 with a polyethylene oxide-isocyanate precondensate. The quantity of polyethylene oxide residues in the emulsifier resin should be from 10 to 20% by weight and the polyethylene oxide units should have an average molecular weight of from 800 to 3000.

A highly effective emulsifier resin consists of a condensate of branched chain polyesters and the reaction products of monoalkyl-terminated polyethylene oxides with diisocyanates as described in German Offenlegungsschriften Nos. 2,556,621 and 2,528,212 (=U.S. Pat. No. 4,028,313).

Any of the emulsifying substances B forming protective colloids which have been described can in principle be used, either singly or as mixtures, for producing the dispersions according to the invention, but for emulsifier mixtures it is preferred to use oligomeric and/or polymeric emulsifier resins of the type described. Exceptionally good dispersions are obtained by using mixtures of an emulsifier resin with a low molecular weight ionic or preferably non-ionic emulsifier, in which the total quantity of emulsifying substances should be below 10% by weight (based on the non-volatile) constituents of the dispersion).

In addition to water, the aqueous phase C may contain neutralising agents in a quantity at least sufficient for partial or complete neutralisation of the carboxyl groups still present in the alkyd resin or polyester resin A. The neutralising agents used may be alkalies, ammonia or, preferably, the amines mentioned above. When emulsification is carried out solvent-free, the amine is preferably stirred into the solvent-free mixture together with part of the water and the remainder of the water is added after homogenisation, so as to adjust the dispersion to the desired solids content, which is generally from 40 to 60%.

According to a preferred procedure for preparing the dispersions according to the invention, the alkyd resin or polyester A, emulsifier resin and optionally other emulsifying substances B are first intimately mixed in the solvent-free state at 80° to 120° C. Part of the aqueous phase, optionally containing neutralising agent, is then added with stirring at 80° to 100° C. The remainder of the water is then added after homogenisation so as to adjust the dispersion to the desired solids content and viscosity.

The dispersions according to the invention may, if desired be combined with other polymers during or after their preparation, e.g. with polyacrylates, polyurethanes, hard resins and unmodified or modified polymers such as those described by H. Kittel in "Lehrbuch der Lacke and Beschichtungen," Vol. I, Part 1, pages 122–445.

To prepare coatings, aminoplast resins which can be diluted with water are added to the aqueous dispersions, using a proportion by weight of alkyd resin or polyester A to aminoplast (based on the solid resin) somewhere in the range of from 95:5 to 50:50, i.e. the proportion of aminoplast is from 5 to 50, preferably from 10 to 30% by weight, of aminoplast, based on the sum of resin A and aminoplast.

Suitable aminoplast resins include, for example, melamine formaldehyde condensation products and urea formaldehyde condensation products. The melamine resins include all conventional melamine formaldehyde condensates, either non-etherified or etherified with saturated monohydric alcohols having 1 to 4 C-atoms, e.g. the condensates described in French Pat. No. 943,411 by D. H. Solomon, in "The Chemistry of Organic Filmformers", 235–240, John Wiley & Sons, Inc., New York, 1967. The melamine resins may also be partly or completely replaced by other cross-linkable aminoplastics such as those described e.g. in "Methoden der Organischen Chemie" (Houben-Weyl), Vol. 14/2, Part 2, 4th Edition, publishers Georg Thieme Verlag, Stuttgart, 1963, 319 et seq.

The dispersions according to the invention are stable for months when stored at room temperature. A dispersion is regarded as "stable in storage" if, for a given period of time, it shows neither visible signs of decomposition such as flocculation, settling or the like nor significant changes in the properties of a lacquer produced from it. The dispersions according to the invention are very stable even at elevated temperatures, such as those which frequently occur in containers exposed to direct sunlight in storage. They can withstand storage at 50° C. for at least three days but in most cases for much longer without any deterioration in quality.

The usual auxiliary agents and additives may be added to the dispersions according to the invention provided they do not unduly lower the stability of the dispersion, e.g. protective colloids, antifoaming agents, anti-settling agents, anti-frost agents and viscosity regulating additives.

The dispersions according to the invention may be processed into lacquers by conventional methods. For this purpose they may, if desired, be made up into a paste with the usual pigments such as titanium dioxide, barium chromate, iron oxide, etc. by the usual methods, optionally with the addition of combination resins and water. Aqueous pigment dispersions, so-called slurries, may also be used or the added resins may be triturated with the pigment and then mixed with the dispersion.

It is sometimes advantageous, for ease of processing and absorption of pigment, to adjust the dispersion to certain pH values for the preparation of lacquers, e.g. pH 7.5–8.5. The amines already used for neutralisation are in most cases used for this purpose. Additional auxiliary agents such as levelling agents, cross-linking catalysts, and the like may also be added. The lacquers produced from the dispersions according to the invention may be applied by conventional techniques to the materials which are to be lacquered, e.g. immersion, spraying or casting. The viscosity required for these applications is generally adjusted by the addition of water. Small quantities of water-miscible solvents such as ethanol or butyl glycol may also be added but are preferably left out.

The lacquer films applied to their substrates may be hardened at elevated temperatures, e.g. from 60° to 270° C. The higher temperatures range is preferably used for alkyd resins containing only a small quantity of oil and for oil-free polyesters.

The dispersions according to the invention may be used not only for the preparation of lacquers but also as starting materials for building solid structures, such as moulded bodies, gels and the like.

The following Examples serve to explain the invention without restricting it. The parts given are parts by weight and the percentages are percentages by weight.

EXAMPLES

I. Preparation of the Emulsifiers

Emulsifier 1

(a) Preparation of a hydrophilic isocyanate component 400 g of a polyethylene oxide alcohol with a molecular weight of 2000 based on n-butanol are dehydrated for 30 minutes at 120° C. by application of a vacuum. (15 Torr) in a 2-liter stirrer cup apparatus equipped with internal thermometer, stirrer, dropping funnel and gas inlet tube. 2 ml of benzoyl chloride are stirred into the solvent-free mixture when it has cooled to 100° C. 33.6 g of hexamethylene diisocyanate are subsequently added all at once.

The isocyanate content of the mixture is determined after a reaction time of 60 minutes. The isocyanate number of the mixture is then 1.8–1.9% NCO (calculated: 1.95%).

After cooling of the melt, the hydrophilic isocyanate component (a) which is suitable for further reaction is obtained as a waxy crystalline substance.

(b) Preparation of a polyester

A polyester with an acid number below 4, an OH number of 264 and an average molecular weight $\overline{M}n$ of 1580 is prepared solvent-free from 2 mol of hexahydophthalic acid anhyride, 1 mol of phthalic acid anhydride, 1 mol of maleic acid anhydride and 3.5 mol of trimethylolpropane under a nitrogen atmosphere.

(c) Preparation of the Emulsifier 340 g of the polyester obtained are dehydrated at 140° C. and 12 Torr for 30 minutes. 43.3 g of the hydrophilic isocyanate component (a) are then added to the melt at 120° C. The melt is stirred under nitrogen at 120° C. for one hour. No free isocyanate can be detected at the end of this time. 26.2 g of phthalic acid anhydride are then introduced into the solvent-free melt. The acid number of the modified polyester is determined after a reaction time of 70 minutes at 120° C. and found to be 28.4 (calculated 28.1). 14.5 g of 2-dimethylaminoethanol are introduced into the hot melt of the resulting modified polyester. The proportion of ethylene oxide units in the modified polyester is 9.45% by weight and the carboxylate group content is 1.53% by weight.

Emulsifier 2

(a) 134 g of trimethylolpropane and 130.7 g of tetrahydrophthalic acid anhydride are esterified to an acid number of 4 at 220° C. under a nitrogen atmosphere. The viscosity of the resulting preliminary stage (a) corresponds to an outflow time (determined on a 60% solution in dimethylformamide according to DIN 53 211) of 170 seconds.

(b) 500 g of this preliminary stage and 88.2 g of the hydophilic isocyanate component (see preparation of emulsifier 1) are reacted together at 100°–105° C. until no more free isocyanate groups can be detected.

(c) 580 g of the product obtained under (b) are reacted with 39 g of tetrahydrophthalic acid anhydride at 120° C. to form a polysemiester with an acid number of about 27.

26.1 g of dimethylethanolamine are carefully added with stirring at 95°–100° C. to 610 g of the product of stage (c).

The resin solidifies on cooling to a tough elastic fusible mass.

Emulsifier 3

Ethylene oxide grafted on nonylphenol (molar ratio 1:20) having the following properties:

Turbidity point (1% in water) about 100° C.
Surface tension (0.1 g/l of water): 44.0 dyn/cm
Wetting action (DIN 53 901): about 60 seconds at 60° C.
Mp. about 30° C.

Emulsifier 4

Preparation analogous to 1 but 60 g of hydrophilic isocyanate component (a) are added to 340 g of the polyester obtained under (b).

II. Preparation of the alkyd resins or polyesters A

Resin (A)

After a heating up phase 173.1 parts of the preliminary stage used for resin B, 83.1 parts of trimethylolpropane, 11.8 parts of neopentyl glycol, 11.9 parts of benzoic acid and 115.8 parts of tetrahydrophthalic acid anhydride are esterified in a suitable reactor under a stream of nitrogen at about 195° C. until the acid number is 16. The final viscosity of the resin, determined at a concentration of 50% in xylene according to DIN 53211, corresponds to an outflow time of 119 seconds. The oil content of the resin is 41%.

Resin (B)

84.6 parts of castor oil, 3.56 parts of trimethylol propane and 11.84 parts of phthalic acid anhydride are boiled at 250° C. under dehydrating conditions to form a product with an acid number of 25 to 35.

After a heating up phase, 137.4 parts of this preliminary stage, 90.2 parts of trimethylolpropane, 11.8 parts of neopentyl glycol, 11.9 parts of benzoic acid and 120.4 parts of tetrahydrophthalic acid anhydride are esterified in a suitable reactor at about 195° C. under a stream of nitrogen until the acid number of the product is 15–16. The final viscosity of the resin determined at a concentration of 50% in xylene according to DIN 53 211 corresponds to an outflow time of 120 seconds and the oil content is about 35%.

Resin (C)

134 Parts of trimethylolpropane, 74.5 parts of adipic acid, 64.4 parts of tetrahydrophthalic acid anhydride and 81.2 parts of hexahydrobenzoic acid are esterified to an acid number of 16 at about 200° C. in a suitable reactor under a nitrogen atmosphere after a heating up phase. The viscosity of the resin, determined on a 50% solution in xylene according to DIN 53 211, corresponds to an outflow time of 113 seconds. The proportion of condensed tetrahydrophthalic acid esters, based on the whole acid component, is about 45%.

EXAMPLE 1

Preparation of the dispersion: 19539.0 parts of Resin B, 840.4 parts of Emulsifier 4 and 630.3 parts of Emulsifier 3 are added together and heated to 120° C. in a nitrogen atmosphere for 30 minutes with stirring and maintained at this temperature for 15 minutes. A mixture of deionised water and dimethylethanolamine (abbreviated DMEA) is then added at about 100° C., the temperature in the reaction falling to 50°–40° C. The quantity of water and DMEA is calculated so that (a) the carboxyl groups of the resins are completely neutralised, and (b) the dispersion formed has a solids content of about 40%. A finely divided, fluid dispersion is obtained on cooling.

Preparation of pigmented white lacquers 4.8 parts of DMEA (50% in water), 100 parts of water-soluble melamine resin (90% in i-propanol) with a Gardner viscosity of Z 2–Z 6, 210 parts of TiO$_2$ pigment and 180 parts of water are triturated in a bead mill for 15 minutes. 525 Parts of the above dispersion are then added and the mixture is triturated for a further 5 minutes. The resulting lacquer has a degree of pigmentation of 70% and a proportion of alkyd resin to melamine resin of 7:3. After a ripening time, the lacquer is diluted with deionised water to a viscosity corresponding to an outflow time of 20 seconds and then sprayed on glass plates or steel sheets. After exposure to air for some time, the coated articles are stoved at 140° C. for 30 minutes.

The coatings obtained have an even flow and the following properties:

Thickness of layer about 40 μm;
Gloss (Gardner 20°): 76;
Mandrel bending test (ASTM D-522-60): 32%;
Erichsen cupping (DIN 53156): 7.5;
Grid Section (DIN 53 151): 0–1;
Pencil harndess: HB;
Pendulum hardness (DIN 53 157): 104 seconds;
Direct Impact cupping (ASTM-D-2794): 50+;
Water resistance in water at room temperature: 10 days without softening or formation of blisters (DIN 53 209).

Stability in Storage

The dispersion is stable for weeks in storage at room temperature. It can withstand storage at 50° C. for 5 days without harmful effects. It is only after 12 days at 50° C. that a small quantity of redispersible ground sediment forms.

The following properties were determined on a white lacquer prepared from a dispersion which had been stored for 12 days at 50° C.:

Layer thickness ~40 μm;
Gloss (Gardner 20°): 76;
Erichsen cupping (DIN 53156): 8.0;
Pencil hardness: HB;
Direct impact cupping: 60+;
Mandrel bending test: 32%;
Grid section: 1;
Pendulum hardness: 85 seconds;
Water resistance in water at room temperature: 10 days without softening or formation of blisters.

EXAMPLE 2

1860.0 Parts of Resin B, 80.0 parts of Emulsifier 2 and 60.0 parts of Emulsifier 3 are worked up into a 40% dispersion as described in Example 1 and made up into a white lacquer by the process described in Example 1.

A coating which has the following properties is obtained:

Layer thickness 33 μm
Gloss (Gardner 20° C.): 77;
Erichsen cupping (DIN 53 156): 8.9;
Pencil hardness: HB;
Direct impact cupping: 44;
Pendulum hardness: 94 sec.
Mandrel bending test: 32%;
Grid section: 1.

The dispersion is still in perfect condition after 12 days' storage at 50° C.

EXAMPLE 3

1860 Parts of Resin A, 80.0 parts of Emulsifier 1, and 60.0 parts of Emulsifier 3 are made up into a 40% dispersion as described in Example 1. A white lacquer is prepared from the dispersion by the method indicated in Example 1. A coating obtained from this lacquer by stoving (30 minutes at 140° C.) has the following properties:

Layer thickness 31 μm
Gloss (Gardner 20°): 79
Erichsen cupping (DIN 53 156): 8.0
Pencil hardness: HB
Direct impact cupping: 80+
Grid section: 0–1
Storage in water at 40° C.: at least 2 days without softening or formation of blisters.

EXAMPLE 4

Preparation of Dispersion 3245.3 Parts of Resin C, 139.6 parts of Emulsifier 2 and 104.7 parts of Emulsifier 3 are stirred up at 110° to 125° C. to form a homogeneous melt. This melt is introduced with stirring at about 115° C. into the previously prepared aqueous phase which has been preheated to about 40° C. and contains the quantity of water and dimethylethanolamine required to neutralise about 90% of the COOH groups in Resin C and adjust the solids content of the resulting dispersion to about 50%. Stirring is continued for a further 30 minutes and the resin content is then adjusted to 45% with water. The dispersion obtained is highly stable in storage and can withstand 50° C. for 30 days without forming a ground deposit.

PREPARATION OF A WHITE LACQUER

476 Parts of water-soluble melamine resin, 2.3 parts of dimethylethanolamine, 750 parts of $TiO_2$ pigment and 333 parts of water are triturated in a bead mill for 15 minutes. A white lacquer containing alkyd resin and melamine resin in proportions by weight of 7:3 and having a degree of pigmentation of 75% is prepared by mixing this triturate with the dispersion previously described. After a ripening time of 1 day, this lacquer is diluted with water to a spraying viscosity corresponding to an outflow time of 21 seconds (DIN 53 211) and sprayed on glass plates or metal sheets and stoved at 140° C. for 30 minutes. The lacquer coat obtained has the following properties:

Gloss (Gardner 20°): 71
Erichsen cupping: 6.5
ASTM mandrel: 32%
Grid section: 1
Pencil hardness: 4 H
Pendulum hardness: 129 seconds.

When the lacquers are stored in water at room temperature, no sign of bubbles, softening or loss of bonding is found after 20 days.

We claim:

1. Aqueous dispersions which are opaque heterogeneous systems and in which an organic resin phase is distributed in water as particles having an average size of from 50 to 3000 nm, which comprises (A) 25–60% by weight of dispersed alkyd resins or oil-free polyesters having an average molecular weight $M_n$ of from 800 to 6000, (B) 3–15% by weight of emulsifiers, and (C) 25–62% by weight of aqueous phase, based in each case on the sum of components (A), (B), and (C) characterized in that the alkyd resin or oil-free polyester (A) has an acid number of from 3 to 25 and the acid component of the alkyd resin or oil-free polyester (A) consists of (a) 10–100 mol % of condensed residues of polybasic carboxylic acids having 4–30 C-atoms in which the carboxyl groups are attached to secondary and/or tertiary C-atoms which do not form part of an aromatic system and are not linked to other C-atoms through a multiple bond, (b) 0–90 mol % of condensed residues of other aliphatic and/or aromatic polybasic carboxylic acids having 4 to 12 C-atoms, and (c) 0–60% by weight of condensed residues of aliphatic, cycloaliphatic and/or aromatic monocarboxylic acids having 6–35 C-atoms, the molar percentages being based in each case on the sum of components (a) and (b) and the percentages by weight of (c) being based on alkyd resin or polyester (A).

2. A process for the preparation of dispersions according to claim 1, in which the alkyd resin or oil-free polyester (A) is homogenised in the solvent-free state with the emulsifier at temperatures of from 80°–120° C. and the water or aqueus phase (C) is stirred into the solvent-free melt, or conversely the melt is stirred into the water or aqueous phase (C).

3. The use of the dispersions according to claim 1 in combination with water-soluble aminoplasts as stoving lacquers.

4. An aqueous dispersion according to claim 1 wherein emulsifier component (B) is a polyester coupled directly to at least one polyalkylene oxide chain having 2 to 4 carbon atoms or coupled through an intermediate member to at least one polyalkylene oxide chain having 2 to 4 carbon atoms wherein said intermediate member is a melamine resin moiety, a polyisocyanate moiety or a silicone, wherein the quantity of the polyalkylene oxide moieties in the emulsifier are from 5 to 70% by weight.

* * * * *